I. W. KELLY.
SILO FILLER.
APPLICATION FILED SEPT. 27, 1913.
1,132,946.
Patented Mar. 23, 1915.
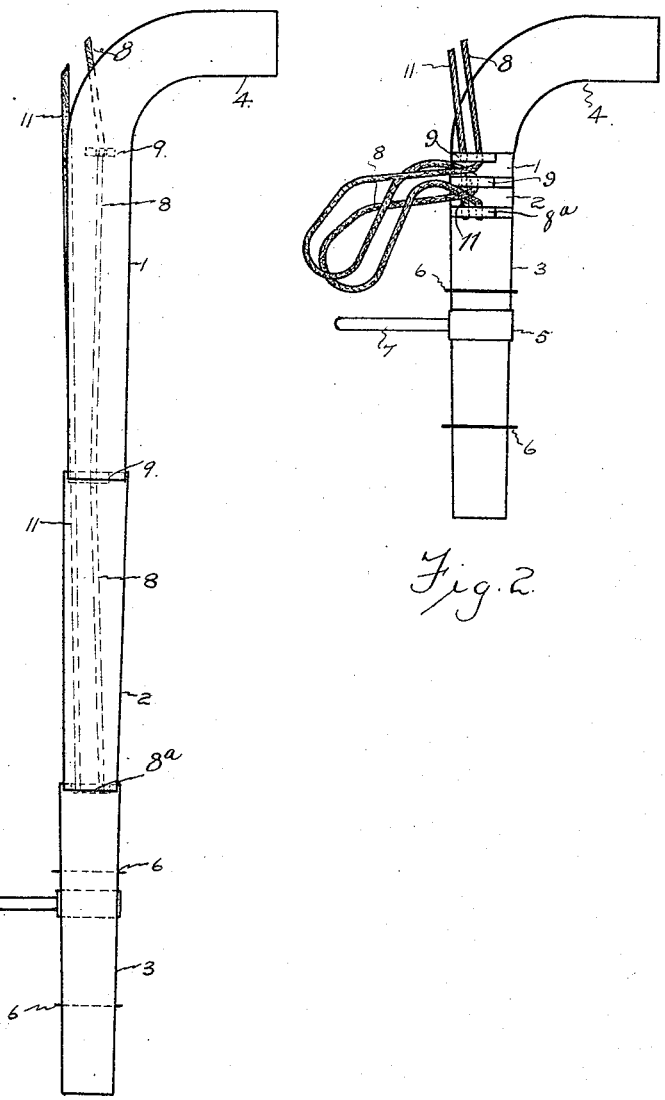
Witnesses
J. Thomas.
Lirtie Nicholson,
Inventor
Isaac Wesley Kelly.
By Alfred T. Bratton
Attorney

UNITED STATES PATENT OFFICE.

ISAAC W. KELLY, OF LYNDEN, ONTARIO, CANADA.

SILO-FILLER.

1,132,946.  Specification of Letters Patent. Patented Mar. 23, 1915.

Application filed September 27, 1913. Serial No. 792,131.

*To all whom it may concern:*

Be it known that I, ISAAC WESLEY KELLY, a subject of the King of Great Britain, and a citizen of the Dominion of Canada, residing at Lynden, in the county of Wentworth, Province of Ontario, Dominion of Canada, have invented certain new and useful Improvements in Silo-Fillers, of which the following is a specification.

This invention relates to silo fillers and it has for its object to provide a collapsible or telescopic filler which can be readily and expeditiously fixed in position and removed when desired.

My invention is illustrated on the accompanying sheet of drawings, in which—

Figure 1, represents by a longitudinal section one convenient embodiment of the invention; and Fig. 2, is an exterior elevation showing the silo filler in its collapsed position.

According to my invention I construct a series of tapered telescopic tubes 1, 2, 3, for example, from appropriate material, the uppermost section 1, whereof is formed with an elbow or the like 4, adapted for ready fixture to the source of feed in any appropriate manner. To the lower section 3, I fit a circumscribing or annular sleeve 5, adapted for movement between fixed flanges 6, 6, and to said sleeve I attach a handle or manipulating member 7, by means of which the filler can be easily moved over the inner area of the silo.

8—8 are members of flexible material connected to an extension 8ª of the lower section 3 and threaded through eyelets 9—9 on the upper sections 1—2 and which members may be secured at their upper ends to any fixed support (not shown) said members then serving to limit the extension of the telescopic sections so that they may never become disengaged from each other. Also connected to the extensions 8ª and threaded through the eyelets 9 are flexible members 11—11 which when drawn upon collapse the telescopic filler as illustrated in Fig. 2. Particular attention is directed to the handle 7 which is so mounted upon the lower section 3 that as the material rises in the silo the handle may be moved either vertically or horizontally to a position most convenient to the user. When the material has risen nearly to the lower end of the lower section 3 the handle will lie near the upper flange 6. Then the filler will be partly collapsed to continue the filling operation and since this will lift the lower end of the spout away from the body of material or ensilage the most convenient position for the handle will then be near the lower flange 6.

From the foregoing it will be readily seen that by my invention I provide an extremely simple and effective device for the purpose specified, and I wish it clearly understood that the details of size and the number and proportions of the several parts may be varied without in any way departing from the spirit and scope of my said invention.

Having thus fully described my invention what I claim as new and desire to secure by Letters Patent, is:—

1. A silo filler comprising a plurality of telescoping sections, spaced fixed annular members surrounding the lowermost section, an annular member surrounding the said section and arranged to turn thereon and move vertically between said fixed annular members and a handle carried by the movable annular member.

2. A silo filler comprising a plurality of telescoping sections in combination with a handle mounted for both vertical movement upon and horizontal movement around the lowermost section and means for limiting the vertical movement of said handle.

Signed at Hamilton, Ontario, Canada, this 6th day of September, A. D. 1913.

I. W. KELLY.

In the presence of—
ALFRED T. BRATTON,
GERTIE NICHOLSON.

Copies of this patent may be obtained for five cents each, by addressing the "Commissioner of Patents, Washington, D. C."